US008193970B2

(12) United States Patent
Miscopein et al.

(10) Patent No.: US 8,193,970 B2
(45) Date of Patent: Jun. 5, 2012

(54) PROCESSING OF A RADIO-COMMUNICATION FRAME IN A SYSTEM COMPRISING AT LEAST THREE RADIO TRANSMITTER/RECEIVER DEVICES

(75) Inventors: Benoit Miscopein, Grenoble (FR); Jean Schwoerer, Grenoble (FR); Francois Marx, Paris (FR)

(73) Assignee: France Telecom, Paris (FR)

( * ) Notice: Subject to any disclaimer, the term of this patent is extended or adjusted under 35 U.S.C. 154(b) by 672 days.

(21) Appl. No.: 11/794,676

(22) PCT Filed: Dec. 23, 2005

(86) PCT No.: PCT/FR2005/003276

§ 371 (c)(1), (2), (4) Date: Aug. 3, 2009

(87) PCT Pub. No.: WO2006/072698

PCT Pub. Date: Jul. 13, 2006

(65) Prior Publication Data

US 2009/0298436 A1 Dec. 3, 2009

(30) Foreign Application Priority Data

Jan. 3, 2005 (FR) ..................................... 05 00017

(51) Int. Cl.
*G01S 13/74* (2006.01)

(52) U.S. Cl. ........................... 342/42; 342/118; 342/125

(58) Field of Classification Search .................... 342/42, 342/118, 125
See application file for complete search history.

(56) References Cited

U.S. PATENT DOCUMENTS

| | | | | |
|---|---|---|---|---|
| 5,363,109 | A * | 11/1994 | Hofgen et al. | 342/31 |
| 5,627,546 | A * | 5/1997 | Crow | 342/352 |
| 5,661,492 | A * | 8/1997 | Shoap et al. | 342/465 |
| 6,317,584 | B1 * | 11/2001 | Abu-Amara et al. | 455/12.1 |
| 2001/0053699 | A1 | 12/2001 | McCrady et al. | |
| 2002/0028687 | A1 * | 3/2002 | Sato et al. | 455/466 |
| 2003/0060166 | A1 | 3/2003 | Rosenfeld | |
| 2003/0093187 | A1 * | 5/2003 | Walker | 701/1 |
| 2003/0233192 | A1 * | 12/2003 | Bayh et al. | 701/301 |

FOREIGN PATENT DOCUMENTS

| | | |
|---|---|---|
| DE | 103 05 358 | 7/2004 |
| EP | 1 213 939 | 6/2002 |

* cited by examiner

*Primary Examiner* — Timothy A Brainard

(74) *Attorney, Agent, or Firm* — McKenna Long & Aldridge LLP

(57) ABSTRACT

The invention relates to a method of implementing operations involving the processing a radio-communication frame (CMF) in a system comprising at least three radio transmitter/receiver devices (1-5), consisting in transmitting the frame in response to a first request signal (REQ1) transmitted by a device belonging to the system (1). According to the invention, the frame is processed in the device (1) that transmitted the first request signal (REQ1) as well as in other devices belonging to the system (1, 3-5) which transmitted respective request signals (REQ2-REQ4) within a pre-determined time period.

8 Claims, 2 Drawing Sheets

Figure 1:
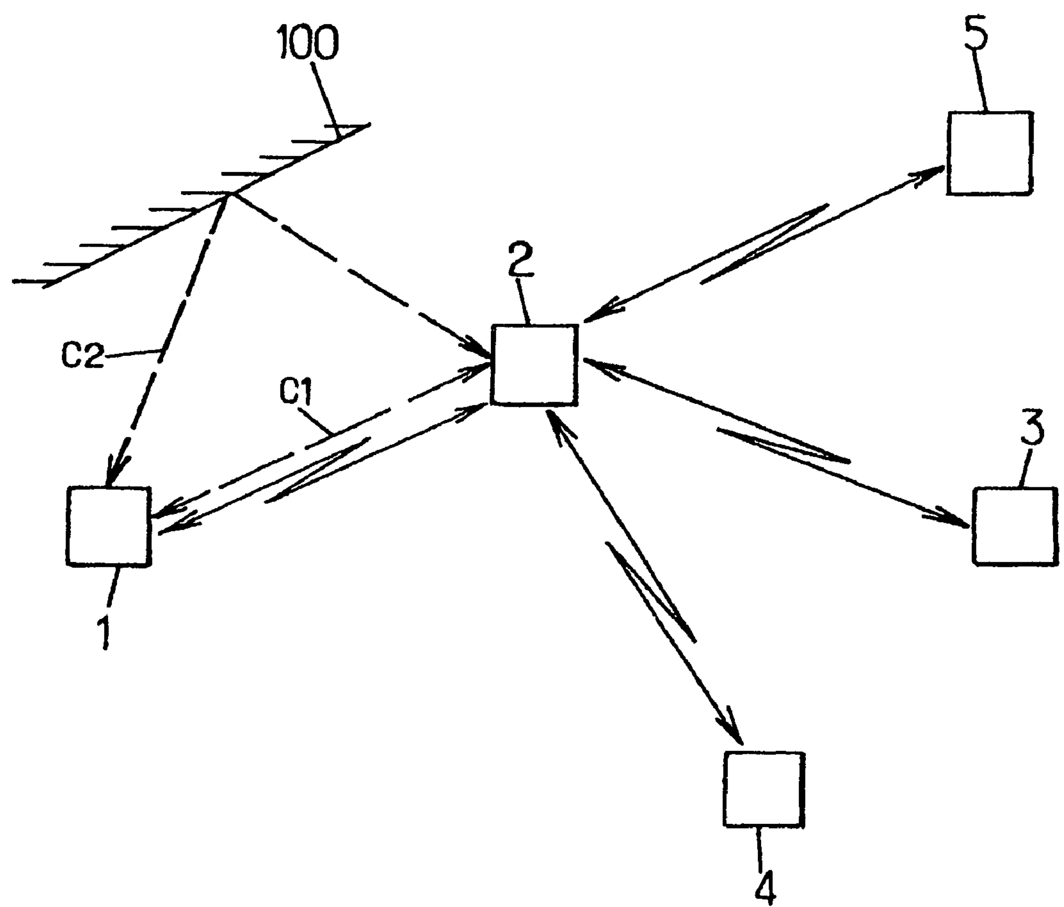

PROCESSING OF A RADIO-COMMUNICATION FRAME IN A SYSTEM COMPRISING AT LEAST THREE RADIO TRANSMITTER/RECEIVER DEVICES

The present invention relates to a method of processing a radiocommunication frame within a system comprising at least three radio transmitter-receiver devices, and a radio transmitter-receiver device suitable for implementing such a method. It can be applied, in particular, to the measuring of distances between radio devices.

The invention relates more specifically to a situation wherein a request is transmitted by a first radio device to a second radio device, to which the second device responds by producing a radio frame whose content is not specific to the first device. Such a situation arises, for example, in a procedure for identifying devices in an "ad hoc" network. The term "ad hoc" network is used to mean a transmission network capable of recognizing changes to the latter autonomously, that is, with no outside intervention. In this case, a device transmits one and the same identification signal in response to each request produced by any one of the other devices of the system.

A similar situation arises when a mobile radiocommunication device is linked to a mesh network or to an "ad hoc" network which uses a routing algorithm based on the position of the mobile device. Devices whose respective positions are known each transmit a distance measurement request to a mobile device entering into the system, or that has recently moved. The latter responds to each request by sending a channel measurement frame which enables the requesting device to identify different radio signal propagation paths. Such a channel measurement frame has a content known to those skilled in the art, which is independent of the device that produced the request.

In these situations, one and the same frame is therefore transmitted multiple times. These multiple transmissions mobilize radio resources in the frame transmitting device as many times. They also generate an energy consumption proportional to the number of transmissions. When the frame is addressed to numerous requesting devices, the resulting mobilization of radio resources and energy consumption can be significant. They are all the more significant when the frame is long, as is the case for a channel measurement frame, in particular. Furthermore, the significant energy consumption that is generated is particularly disadvantageous for a device with autonomous energy supply, such as a mobile device, for example.

An object of the present invention is therefore to overcome the abovementioned drawbacks, in a situation wherein one and the same frame must be transmitted to a plurality of requesting devices.

To this end, the invention proposes a method of implementing operations using a radiocommunication frame in a system comprising at least three radio transmitter-receiver devices. The method comprises the following steps:

a—transmission of a first request radio signal to a first system device by another system device;

b—transmission of at least one second request radio signal by another system device to said first device;

c—transmission of a frame by said first device in response to said first request radio signal; then d—use of said frame in said other system device that sent said first request radio signal.

The method also comprises the use of the frame in the other system devices that sent a second request signal in a predetermined time slot.

Put another way, N devices of the system can each transmit a respective request to one and the same system device, N being an integer greater than or equal to 2. Among the N devices, the one that transmits its request first initiates the method of the invention, and receives the frame in response to its request. The N−1 other devices can use the same frame if their respective requests are detected by the device transmitting the frame during the predetermined time slot, the counting of which may be caused by the request transmitted first.

Thus, a single frame being useful to perform the operations in several devices during a predetermined time slot, the first one of the devices can reduce the number of frames sent during this time slot. Such a reduction in the number of frames transmitted results in a reduction in the radio resources mobilized within said first device and reduced energy consumption.

Put another way, the frame is transmitted "free of charge" to the N−1 devices that transmitted their request after the one that initiated the method. This gain is all the greater when the transmitted frame is long and the system comprises a large number of devices each possibly producing a request.

The radio resource has therefore been mobilized only once to transmit the frame, and a quantity of energy corresponding to only a single frame transmission has been consumed. Resource mobilization and energy consumption are therefore reduced to a minimum for a given predetermined time slot.

If necessary, the first request signal and one of the second request signals can be transmitted by one and the same system device.

Preferably, said first system device transmits no frame in response to the second request signal transmitted in the predetermined time slot. This way, the energy consumption and resource mobilization savings within the first device are as great as possible.

The predetermined time slot during which a frame is transmitted by the first device in response to the first request radio signal can be chosen so as to obtain a trade-off between, on the one hand, the energy consumption and radio resource mobilization, and, on the other hand, the stationarity of the channel. The longer the time slot, the fewer the resources mobilized and the smaller the consumption. However, the longer the time slot is, the greater is the risk of channel nonstationarity between the instant of transmission of the second radio request signal and the receipt of the frame by another of the devices, resulting in imprecisions in the operation implemented by the other devices having transmitted the second request, in particular when the frame is a channel measurement frame.

According to one preferred embodiment of the invention, the predetermined time slot comprises a first duration greater than a determined guard time between the reception of said first request signal by said first device and the transmission of the frame, and/or a second duration at least equal to a determined listening time after the transmission of the frame.

The frame is preferably transmitted at an instant that is determined by a multiple-access controller. In this case, the multiple-access controller designates an available radio time slot which is sufficient to transmit the frame without disturbing any calls in progress. Each transmitter-receiver device of the system can incorporate a separate multiple-access controller, such as, for example, in a CSMA/CA (Carrier Sense Multiple Access with Collision Avoidance) system. Alternatively, a general multiple-access control can be used, such as, for example, in a TDMA (Time Division Multiple Access) system.

The invention can in particular be implemented to measure separation distances between devices of a radiocommunication system. To this end, the frame transmitted to be used by several devices of the system can be a channel measurement frame. In practice, the use of such a frame by each receiver device concerns characteristics that appear when the radio signals corresponding to the latter are propagated to each receiver device. The content of the frame when it is transmitted is independent of the receiver devices.

The invention thus also proposes a method of measuring distances between a first system device and at least two other system devices, which uses a method of implementing operations using a radiocommunication frame as described previously. Such a distance measuring method also comprises:

a—in response to each detected request signal, a transmission of an acknowledgement signal by said first device, intended for said other device that transmitted said request signal; and b—a measurement of a radio signal exchange time from an instant of transmission of each request signal and an instant of reception of the acknowledgement signal transmitted in response to said request signal.

When a guard time and/or a listening time are respectively provided before and/or after the transmission of the frame, the distance measuring method advantageously comprises a determination of the respective separation distance between said first device and each of the other devices, based on the exchange time and an analysis of received radio signals corresponding to said frame.

The invention finally proposes a radio transmitter-receiver device suitable for implementing the steps carried out by the first and/or another of the devices of a method of implementing operations using a frame, or a distance measuring method, as described previously.

Figure 2:
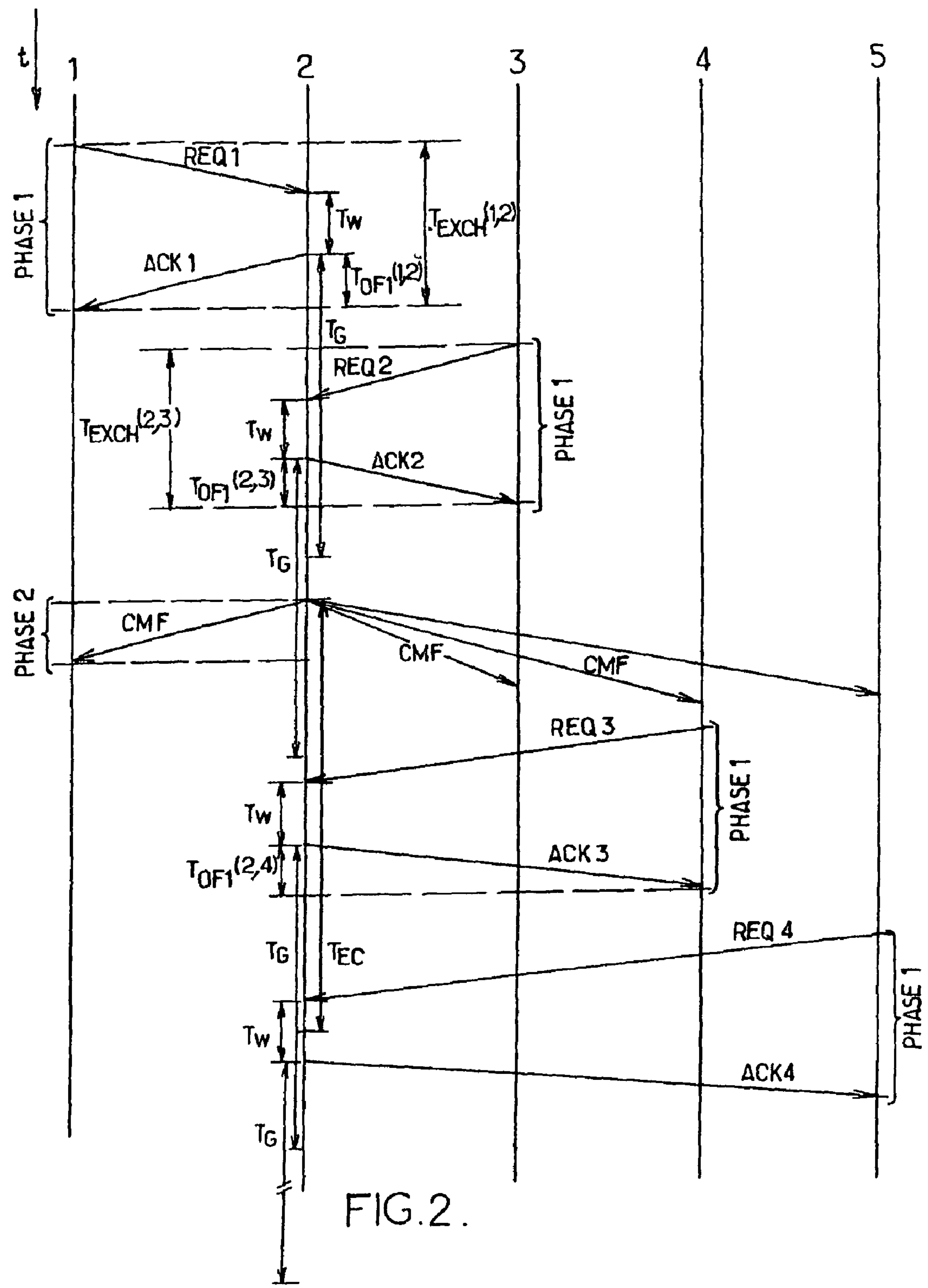

Other features and advantages of the present invention will become apparent from the description that follows of an exemplary and non-limiting example, with reference to the appended drawings, in which:

FIG. 1 illustrates a radiocommunication system designed to implement a method according to the invention; and FIG. 2 is a chronological diagram of the various steps of a method according to the invention.

The invention will now be described in detail in the context of a distance measurement between several mobile radio transmitter-receiver devices. The intention is for this application of the invention to be given only as an illustration, and for the invention to be implemented in the context of numerous other applications.

According to FIG. 1, a communication system comprises a set of radio transmitter-receiver devices, five of which are referenced 1 to 5. Each transmitter-receiver can constitute the radio interface for a sensor that is part of a home automation management system, for example. For such a system, certain sensors can be dedicated to heat measurements, others to identifying the state of heating element control units, and so on. It can be an "ad hoc" system, which itself manages the communication sequences between the different sensors. This can be, in particular, a system of the Bluetooth type, known to those skilled in the art.

The distance measurement between the devices 1 and 2 is described first. The use of the invention to also measure the distances between the devices 2 and 3, 2 and 4 then 2 and 5 will be described later.

The left part of FIG. 2 indicates the successive actions that are carried out in the devices 1 and 2, when the device 1 initiates a measurement of the distance that separates it from the device 2. The downward vertical axis corresponds to a time coordinate, denoted t. Firstly, the device 1 sends a request, denoted REQ1, to the device 2. The request REQ1 initiates a measurement of an exchange delay for radio signals transmitted between the devices 1 and 2. Furthermore, it solicits the transmission of a channel measurement frame by the device 2.

When the device 2 receives the request REQ1, it can either refuse the measurement, or accept it. If it accepts it, it responds by addressing an acknowledgement signal ACK1 to the device 1. The detection and reception of the radio signals by each of the devices 1 and 2 are carried out in a known manner and not described further here.

The device 2 transmits the signal ACK1 after a determined waiting time, counted from the reception of the request REQ1. This waiting time is set by the manufacturer of the devices and stored in each one of the latter. It is denoted $T_w$ and called intermediate delay. It mainly enables a device that receives a distance measurement request to switch from the radio signal reception mode to the transmission mode. Furthermore, the frame of the ACK1 signal is prepared during the delay $T_w$.

The ACK1 signal is transmitted without involving the multiple-access manager of the device 2. Put another way, at the end of the intermediate delay $T_w$, the device 2 interrupts any transmission or reception of radio signals that may be in progress to transmit the ACK1 signal. Such an interruption of transmission or reception may affect a communication between the device 2 and any other device of the system. In this way, the time between the reception of the request REQ1 and the transmission of the signal ACK1 by the device 2 is known accurately by the device 1: it is equal to the delay $T_w$.

When the device 1 receives the ACK1 signal, it determines the time elapsed since the transmission of the request REQ1. This time is called radio signal exchange time between the devices 1 and 2, denoted $T_{EXCH}(\mathbf{1}, \mathbf{2})$. It is stored in the device 1.

The device 1 then calculates a time of flight $T_{OF1}(\mathbf{1}, \mathbf{2})$ of the signals REQ1 and ACK1 exchanged between the devices 1 and 2, according to the following formula (1):

$$T_{OF1}(1,2)=0.5\times[T_{EXCH}(1,2)-T_w] \quad (1)$$

A length of the paths traveled by the signals REQ1 and ACK1 can also be calculated, by dividing $T_{OF1}(\mathbf{1}, \mathbf{2})$ by the propagation speed of the radio signals between the system devices. This speed is equal to $3.10^8$ m.s$^{-1}$.

The exchange of the signals REQ1 and ACK1 and the calculation of $T_{OF1}(\mathbf{1}, \mathbf{2})$ constitute a first phase of the method of measuring the distance between the devices 1 and 2. This first phase is denoted 1 in FIG. 2.

The propagation path taken by the signals REQ1 and ACK1 can either link the devices 1 and 2 in a straight line (path C1 indicated in FIG. 1), or link them with at least one intermediate reflection. The path C2 indicated in FIG. 1 presents a reflection on the wall 100, for example made of metal. Because of this reflection, the path C2 is longer than the path C1. The time of flight $T_{OF1}(\mathbf{1}, \mathbf{2})$ generally corresponds to that of the propagation paths C1 and C2 that is taken by a main part of the energy of the radio signals REQ1 and ACK1.

A second phase of the method of measuring the distance between the devices 1 and 2 is then carried out (phase 2 in FIG. 2). The device 2 transmits a channel measurement frame, denoted CMF. This transmission of the CMF frame is carried out in accordance with the multiple access to the radio transmission resource of the device 2. For this, the frame 2 is transmitted when the multiple-access manager, which can be incorporated in the device 2, identifies the possibility of having sufficient transmission time.

The device 1 then analyzes all the radio signals that it receives and that correspond to the frame CMF. The structure of a channel measurement frame, and the method of analyzing the latter are assumed to be known, and will not be described in detail here. The device 1 first identifies a first part of the radio signal received as corresponding to a portion of the frame CMF that has taken the same propagation path as the acknowledgement signal ACK1 of phase 1. This identification may result from a comparison between the energy level of the first part of the received signal corresponding to the portion of frame CMF and that of the signal ACK1 received. The device 1 then looks to see if a second part of the received radio signal does not also correspond to a portion of the frame CMF, that has taken a shorter propagation path than that of the first part of the radio signal. This search is carried out by combining a selection of parts of the radio signal received by the device 1, performed by means of a variable reception energy threshold, and a recognition of portions of CMF frame. The device 1 deduces therefrom a difference in time of flight between the propagation path taken by the ACK1 signal and a shorter path between the devices 1 and 2, the existence of which is detected from the radio signal received corresponding to the frame CMF. This difference is denoted $\Delta T_{OF}$(1, 2).

When several paths are detected, which are shorter than that detected on reception of the signal ACK1, the device 1 selects the one that is the shortest, that is, the one that is associated with the greatest value of $\Delta T_{OF}$(1, 2).

The device 1 then calculates the time of flight of the signals transmitted between the two devices 1 and 2 along the shortest propagation path by the formula (2) below. This time of flight along the shortest path is denoted $\Delta T_{OF2}$(1, 2).

$$T_{OF2}(1,2)=T_{OF1}(1,2)-\Delta T_{OF}(1,2) \quad (2)$$

$T_{OF2}$(1, 2) is a measurement of the length of the shortest propagation path between the devices 1 and 2. This length can be expressed in meters, by dividing $T_{OF2}$(1, 2) by the propagation speed of the radio signals between the system devices. Most often, it corresponds, like $T_{OF2}$(1, 2), to a straight-line propagation of the radio signals between the devices 1 and 2 (path C1 in FIG. 1).

It is possible for the propagation path detected on reception of the signal ACK1 in phase 1 to be that one which is the shortest. In this case, the analysis of the radio signals received by the device 1 that correspond to the channel measurement frame CMF reveals no path that is even shorter. Phase 2 then results in a zero value of $\Delta T_{OF}$(1, 2).

The channel measurement frame CMF is transmitted by the device 2 after the acknowledgement signal ACK1, with a waiting time from the transmission of the signal ACK1 which is greater than or equal to a determined guard time. This guard time is denoted $T_G$ in FIG. 2. The order of magnitude of the guard time is chosen so that the radio transmission channel between the first device and the device transmitting the first request signal may remain stationary during this time. Such channel stationarity provides with favorable conditions for using the frame in the first device, in particular when the frame is a channel measurement frame. The time between the transmission of the signal ACK1 and that of the frame CMF by the device 2 is equal to the sum of the guard time $T_G$ and a delay due to the observance of the multiple access for the device 2. The $T_G$ value is stored in each device of the system when the latter is manufactured or initialized. It must not be too high, in order for the channel used to communicate between the devices 1 and 2 to be considered as being stationary between the phases 1 and 2 of the method. The channel is said to be stationary when the devices 1 and 2 remain substantially immobile and when the transmission medium in which the radio signals are propagated has features that are roughly constant during the distance measurement time. As an example, $T_G$ can be of the order of 10 milliseconds.

Independently of the current measurement of the distance between the devices 1 and 2, the device 3 can request a measurement of the distance that separates it from the device 2. For this, it sends to the device 2 a request signal REQ2 (see FIG. 2), similar to the signal REQ1. It is assumed that the signal REQ2 is received by the device 1 after the signal REQ1, and before the expiry of the guard time $T_G$ counted from the transmission of the signal ACK1 by the device 2.

The signal REQ2 is transmitted by the device 3 at a determined instant by a multiple-access controller. Nevertheless, a collision between the signals ACK1 and REQ2 on the device 2 is possible, since the signal ACK1 must be transmitted on expiry of the intermediate delay $T_w$ counted from the reception of the signal REQ1. However, such a collision is that much less probable when the signals ACK1 and REQ2 are short. Advantageously, they can each comprise a communication frame with no payload data, so that they are processed in the device 2 as near as possible to the physical layer. The respective processing operations of the signals ACK1 and REQ2 by the device 2 can then be fast, which reduces the risk of collision.

Phase 1 of the distance measurement between the devices 2 and 3 is carried out in the manner that has been described previously for the devices 1 and 2. The device 2 returns an acknowledgement signal ACK2 to the device 3, on expiry of a new intermediate delay $T_w$ counted from the reception of the signal REQ2. If the signal REQ2 has been received by the device 2 just before the expiry of the guard time $T_G$ counted from the transmission of the signal ACK1, a transmission of the frame CMF can be delayed by the multiple-access controller of the device 2, so that the frame CMF is transmitted after the signal ACK2.

An exchange time of the radio signals transmitted between the devices 2 and 3, denoted $T_{EXCH}$(2, 3) is timed by the device 3. It is determined by the respective instants of transmission of the signal REQ2 and of reception of the signal ACK2. The device 3 then calculates a time of flight $T_{OF1}$(2, 3) of the signals REQ2 and ACK2 according to the following formula (3), which corresponds to the formula 1 applied to the devices 2 and 3:

$$T_{OF1}(2,3)=0.5\times[T_{EXCH}(2,3)-T_w] \quad (3)$$

As for the device 1, the device 3 also receives the frame CMF transmitted by the device 2. The device 3 determines a difference in time of flight between the radio signals transmitted between the devices 2 and 3: $\Delta T_{OF}$(2, 3) is the difference between the time of flight of the signals REQ2 and ACK2 on the one hand, and the time of flight corresponding to the shortest propagation path between the devices 2 and 3. The time of flight of the radio signals between the devices 2 and 3, along the shortest propagation path, is then calculated by the following formula (4):

$$T_{OF2}(2,3)=T_{OF1}(2,3)-\Delta T_{OF}(2,3) \quad (4)$$

The distance between the devices 2 and 3 has therefore been measured by using the frame CMF transmitted for the measurement of the distance between the devices 1 and 2.

This frame CMF transmitted by the device 2 can also be detected by another device of the system, for example the device 4, before the expiry of a determined listening time, denoted $T_{EC}$ in FIG. 2. $T_{EC}$ may, for example, be a waiting time before the device 2 becomes unavailable to detect a new request signal. It is counted in the device 2, from the instant of transmission of the frame CMF. For example, at the end of the listening time $T_{EC}$, the device 2 performs another task or switches to energy-saving mode. If the distance between the devices 2 and 4 must also be measured, the device 4 similarly analyzes the radio signals that it detects and that correspond to the frame CMF. It deduces from this a value $\Delta T_{OF}(\mathbf{2}, \mathbf{4})$ which it stores.

The listening time $T_{EC}$ can be set in the same way as the guard time $T_G$, while having a different value from the latter. Preferably, $T_{EC}$ is greater than $T_G$, because it is necessary for the device 4 to have finished detecting and analyzing the radio signals received that correspond to the frame CMF before itself transmitting a new radio signal. $T_{EC}$ can be equal to 50 milliseconds, for example.

The device 4 then carries out the phase 1 of the distance measuring method, in order to time an exchange time $T_{EXCH}(\mathbf{2}, \mathbf{4})$. In the same way as previously, signals REQ3 and ACK3 are transmitted between the devices 2 and 4. The device 4 deduces from this a first time of flight $T_{OF1}(\mathbf{2}, \mathbf{4})$. The time of flight of the radio signals between the devices 2 and 4 along the shortest propagation path, $T_{OF2}(\mathbf{2}, \mathbf{4})$, is then obtained by subtracting $\Delta T_{OF}(\mathbf{2}, \mathbf{4})$ from $T_{OF1}(\mathbf{2}, \mathbf{4})$.

The distance between the devices 2 and 4 is therefore also obtained by using the frame CMF transmitted to measure the distance between the devices 1 and 2. To this end, the signal REQ3 has been received by the device 2 after the frame CMF has been transmitted, but before the expiry of the listening time.

The device 2 can, if necessary, receive a distance measurement request signal just before the expiry of the listening time $T_{EC}$. Such is the case of the signal REQ4 (FIG. 2) transmitted by the device 5. It is assumed that, at this instant, the device 5 has received and analyzed the frame CMF, in the same way as the device 4. The activity of the device 2 is then devoted as a priority to the transmission of an acknowledgement signal ACK4 in response to the signal REQ4, observing the intermediate delay $T_w$. The signal ACK4 can then be transmitted after the expiry of the delay $T_{EC}$. The device 5 then determines the distance that separates it from the device 2, in the same way as the device 4.

It emerges from the above detailed description that the frame CMF transmitted in response to the first radio request signal is used for measuring the distances between the device 2 and each of the devices 1, 3, 4 and 5. In other words, the transmission of the frame CMF is common to the distance measurements initiated respectively by the devices 1, 3, 4 and 5. It is thus possible to reduce the number of frames CMF transmitted by the device 2 during the predetermined time slot to a number of frames CMF less than the number of devices requesting this type of frame. In particular, it is possible to reduce the number of frames CMF transmitted by the device during the predetermined time slot to three or two frames, even to just one frame, distributed over this time slot. Energy and radio transmission time savings within the device 2 result from this, but are all the greater when a channel measurement frame is particularly long, in particular compared to a communication frame that transports payload data.

When the predetermined time slot is long, the transmission of several frames by the device 2 can make it possible to reduce the imprecisions linked to the non-stationarity of the channel. For example, in response to the first request REQ1 from the device 1, the device 2 transmits a frame CMF that will be used by another device 3-5 having transmitted a request REQ3-REQ5 at an instant sufficiently removed from the instant of transmission of the frame CMF for the channel to be non-stationary between these two instants. The distance measurement performed by this other device 3-5 can therefore be improved in terms of precision by using a new frame CMF transmitted by the device 2 at an instant closer to the request REQ3-REQ5 in the predetermined time slot.

Moreover, phase 1 of the distance measuring method can be repeated at the initiative of the device 1. On each new execution of phase 1 required by the device 1, a new time of flight value $T_{OF1}(\mathbf{1}, \mathbf{2})$ is obtained. Comparing several time of flight values obtained successively makes it possible to check that the transmission channel between the devices 1 and 2 is stationary. It is also possible to determine $T_{OF1}(\mathbf{1}, \mathbf{2})$ with a greater precision, for example by calculating $T_{OF1}(\mathbf{1}, \mathbf{2})$ based on an average of several exchange delays $T_{EXCH}(\mathbf{1}, \mathbf{2})$ stored on repeated executions of the phase 1.

In this case, the device 1 can repeat the sending of a request signal either before the expiry of the guard time $T_G$, counted from the first request signal transmitted by the device 1, or before the expiry of the listening time $T_{EC}$, counted from the transmission of the frame CMF by the device 2. Phase 1 of the distance measurement between the devices 1 and 2 is then repeated, without the transmission of the frame CMF being delayed. The overall time during which the device 2 is mobilized is therefore not increased.

Similarly, the device 3 can request additional executions of the phase 1 of the measurement of the distance that separates it from the device 2. Such additional executions must be initiated by request signals transmitted by the device 3 within the same delays as those indicated above for the device 1.

Finally, the device 4 can also request multiple executions of the phase 1 of the distance measurement. These must then be initiated during the listening time set by the execution of the distance measuring method that has been triggered by the device 1.

The invention claimed is:

1. A method of implementing operations using a radiocommunication frame in a system comprising at least three radio transmitter-receiver devices, said method comprising the following steps:

a—transmission of a first request radio signal to a first one of the system devices by a second one of the system devices;

b—transmission of at least one second request radio signal by a third one of the system devices to the first system device;

c—transmission of said frame by said first device in response to said first request radio signal;

d—use of said frame in said second system device that sent said first request radio signal; and use of said frame in said third system device that sent said second request radio signal in a predetermined time slot, wherein said frame is a channel measurement frame.

2. The method as claimed in claim 1, also comprising, in response to said second request radio signal transmitted in the predetermined time slot, no transmission of a frame by said first system device.

3. The method as claimed in claim 1, wherein the predetermined time slot comprises a first duration greater than a determined guard time between the reception of said first request radio signal by said first system device and the transmission of the frame, and/or a second duration at least equal to a determined listening time after the transmission of the frame.

4. The method as claimed in claim 1, wherein the frame is transmitted at an instant that is determined by a multiple-access controller.

5. The method as claimed in claim 1, wherein said first and second request radio signals are transmitted by one and the same of the system devices.

6. A method of measuring distances between a first device of a system and at least two other system devices, using a method of implementing operations using a radiocommunication frame, as claimed in claim 1, further comprising:

a—in response to each detected request radio signal, a transmission of an acknowledgement signal by said first system device, intended for said other system device that transmitted said request radio signal; and b—a measurement of a radio signal exchange time from an instant of transmission of each request radio signal and an instant of reception of the acknowledgment radio signal transmitted in response to said request radio signal.

7. The method as claimed in claim 6, wherein the predetermined time slot comprises a first duration greater than a determined guard time between the reception of said first request radio signal by said first system device and the transmission of the frame, and/or a second duration at least equal to a determined listening time after the transmission of the frame, and further comprising:

a determination of the respective separation distance between said first system device and each of the other system devices based on the exchange time; and an analysis of the received radio signals corresponding to said frame.

8. A radio transmitter-receiver device suitable for implementing the steps carried out in the first one and/or one other of the system devices, of a method of implementing operations using a radiocommunication frame as claimed in claim 1, or a method of measuring distances as claimed in claim 6.

* * * * *